United States Patent
Sase et al.

(10) Patent No.: US 8,605,464 B2
(45) Date of Patent: Dec. 10, 2013

(54) POWER CONVERTER, CONTROL METHOD OF POWER CONVERTER, AND HARD DISK DRIVE

(75) Inventors: Takashi Sase, Hitachi (JP); Akihiko Kanouda, Hitachinaka (JP); Yosuke Tsuyuki, Odawara (JP); Hiroyuki Shoji, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/591,264

(22) Filed: Aug. 22, 2012

(65) Prior Publication Data

US 2013/0194698 A1  Aug. 1, 2013

(30) Foreign Application Priority Data

Jan. 30, 2012  (JP) ................................. 2012-016153

(51) Int. Cl.
*H02M 3/335* (2006.01)
(52) U.S. Cl.
USPC ..................................................... 363/21.02
(58) Field of Classification Search
USPC ................... 363/16, 17, 21.02, 21.03, 97, 98
See application file for complete search history.

(56) References Cited

U.S. PATENT DOCUMENTS

| 7,447,048 B2 * | 11/2008 | Yasumura | 363/21.02 |
| 8,199,530 B2 * | 6/2012 | Sase et al. | 363/17 |
| 2009/0154200 A1 * | 6/2009 | Coccia et al. | 363/21.02 |
| 2010/0020569 A1 * | 1/2010 | Melanson et al. | 363/21.03 |
| 2011/0051467 A1 * | 3/2011 | Nakanishi | 363/21.02 |
| 2012/0134705 A1 * | 5/2012 | Fukutani | 399/88 |

FOREIGN PATENT DOCUMENTS

| JP | 2003-23775 | 1/2003 |
| JP | 2008-289228 | 11/2008 |

* cited by examiner

*Primary Examiner* — Gary L Laxton
(74) *Attorney, Agent, or Firm* — Antonelli, Terry, Stout & Kraus, LLP.

(57) ABSTRACT

A power converter includes a first inductor, a rectifier arm, a first switch arm including a first and second switch circuits, a second switch arm including a third switch circuit and a first capacitor, a LC serial circuit, a Transformer, a rectification and smoothing circuit connected to secondary winding of the transformer, and a control circuit to perform on-off control of the three switch circuits. The rectifier arm, the first and second switch arms and the LC serial circuit are connected in parallel with each other. The LC serial circuit and primary winding of the transformer are connected. AC power supply is connected to the rectifier arm via the first inductor. The control circuit includes an output voltage control circuit to control output voltage at specific setting value, an intermediate voltage control circuit to control intermediate voltage at specific setting value, and a power factor correction control circuit.

16 Claims, 11 Drawing Sheets

US 8,605,464 B2

POWER CONVERTER, CONTROL METHOD OF POWER CONVERTER, AND HARD DISK DRIVE

CROSS REFERENCE

This application claims the benefit of Japan Patent Application No. JP2012-016153, filed on Jan. 30, 2012, the disclosure of which is incorporated herein by reference in its entirety.

TECHNICAL FIELD

This invention relates to a power converter for converting AC power from AC power supply to DC power, a control method of a power converter and a Hard disk drive using the converter and the method, and particularly to a low-cost and high-efficiency power converter, by controlling intermediate voltage of direct current at constant setting value, wherein the intermediate voltage is gained from operation by power factor correction at the power converter.

BACKGROUND OF THE INVENTION

As a power converter to convert AC power from AC power supply to DC power, there is a two-stage converter including a PFC converter and an isolation type DC-DC converter or a single-stage converter having operation of a PFC converter and an isolation type DC-DC converter integrated. A single-stage converter has a smaller number of converter stages or diagram components than a two stage converter, so a single-stage converter is suitable for achieving low cost and high efficiency. Such examples are shown in FIG. 9 in JP2003-23775 A and in FIG. 5 in JP2008-289228 A.

In JP2003-23775 A, there are semiconductor switching components Q1 through Q3 in FIG. 9, out of which Q2 and Q3 operate complementarily to Q1. Technique is disclosed to control a terminal voltage of a condenser (capacitor) C1, that is, an intermediate voltage is controlled at a constant setting value by changing on-off duration ratio of switching frequency to control semiconductor switching components Q1 through Q3, a terminal voltage of a condenser (capacitor) C3 or output voltage is controlled at a constant setting value by changing on-off cycle of switching frequency to control these semiconductor switching components.

In JP2008-289228 A, control electrode of semiconductor switching components Q1 through Q3 in FIG. 5 can be controlled individually, and technique is disclosed to control power factor and output voltage.

Even though control method disclosed in JP2003-23775 A can control an intermediate voltage at constant setting value, usage frequency expands to low side and size of used diagram components, especially core size, needs to be larger to lose compactness with high cost, when load current is high with high usage power. There is an additional problem of larger loss at rated load, because discontinuous mode is used for power factor.

On the other hand, a control method disclosed in JP2008-289228 A applies a continuous mode for power factor correction, in order to avoid loss at rated load with discontinuous mode, but there is a problem that an intermediate voltage fluctuates and goes up at light load, requiring condensers with high breakdown voltage, because it does not control a terminal voltage of a condenser C1 or an intermediate voltage at constant setting value. This results in higher cost. Additionally input current waveform is not corresponding to the change of AC power supply voltage in the vicinity of zero, and power factor is not improved.

The present invention is intended to solve those problems and provide a low-cost and high-efficiency power converter.

SUMMARY OF THE INVENTION

An aspect of the invention provides a power converter comprising:
a first inductor,
a rectifier arm including a first diode and a second diode in series connection in the forward-polarity,
a first switch arm including a first switch circuit and a second switch circuit in series connection, both of each having a semiconductor switching component and a diode in reverse parallel,
a second switch arm including a third switch circuit, having a semiconductor switching component and a diode in reverse parallel, and a first capacitor in series connection,
a LC serial circuit including a second inductor and a second capacitor in series connection,
a Transformer including primary winding and secondary winding, a rectification and smoothing circuit connected to secondary winding of the transformer, and
a control circuit for on-off control of the three switch circuits with PWM signal, wherein
the rectifier arm, the first switch arm, the second switch arm and the LC serial circuit are connected in parallel with each other,
the second inductor of the LC serial circuit, the second capacitor and primary winding of the transformer are connected serially,
AC power supply is connected to the connection point of the first and second diodes in the rectifier arm and the connection point of the first and second switch circuits in the first switch arm via the first inductor, and the control circuit comprises:
an Output voltage control circuit for on-off control of at least one of the first or second switch circuit, in addition to the third switch circuit, for controlling output voltage from the rectification and smoothing circuit at specific setting value, using detection information of the output voltage,
an Intermediate voltage control circuit for controlling intermediate voltage at specific setting value, using detection information of terminal voltage at the first capacitor and output current from the rectification and smoothing circuit, and
a power factor control circuit for on-off control of at least the other of the first or second switch circuit, using detection information of input current of the AC power supply and output voltage from the rectification and smoothing circuit, as well as output control signal from the intermediate voltage control circuit.

Other components are explained in the embodiment of the invention.

The present invention can provide the power converter at a low cost and high efficiency.

EMBODIMENTS OF THE INVENTION

Embodiments of the invention will be explained below. These embodiments are intended to provide a single-stage power converter at a low cost and high efficiency, controlling intermediate voltage at constant setting value independent from load.

Explanation will be mainly made for the diagram and operation of the power converter, but also made for a control method of the power converter.

First Embodiment

A first embodiment of the power converter by the invention will be explained with reference to FIG. 1 through FIG. 4.

Figure 1:
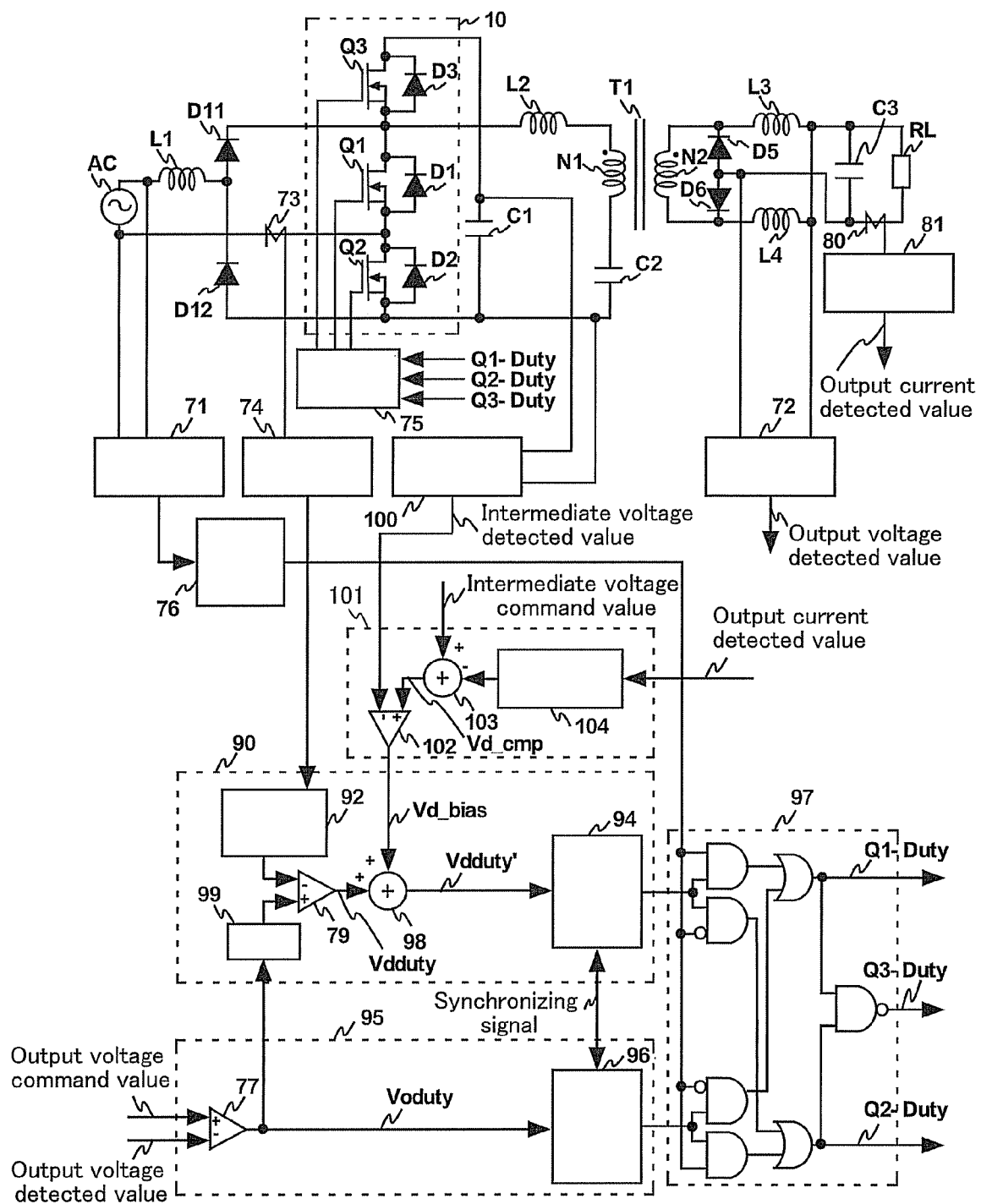
FIG. 1 shows a circuit diagram of a power converter of a first embodiment of the invention.

FIG. 1 is a circuit diagram of the first embodiment of the power converter by the invention.
<Main Circuit of a Power Converter>

First, a main circuit of the power converter will be explained below.

In FIG. 1, a rectifier arm to rectify AC power of an AC power supply AC, includes a diode D11 and a diode D12 which have a forward polarity and are connected in series.

A first switch arm includes a first switch circuit and a second switch circuit in series connection, wherein each of switch circuits connects each of semiconductor switching components Q1 and Q2, of N-type MOSFET (Metal-Oxide-Semiconductor Field-Effect Transistor), and each of diodes D1 and D2, respectively, in reverse parallel, and the diodes D1 and D2 are in the forward-polarity.

Here the diodes D1 and D2 exist as body diodes structurally in the semiconductor switching components Q1 and Q2, made of N-type MOSFET, so the diodes D1 and D2 might be connected in reverse parallel with each other, even when the switching components Q1 and Q2 are simply described. Additional diodes may be attached and connected when switching components other than MOSFET are used.

A second switch arm includes a third switch circuit and a capacitor C1 in series connection, wherein a third switch circuit connects a semiconductor switching component Q3, of N-type MOSFET, and a diode D3 in reverse parallel.

The rectifier arm and the first and second switch arms are connected in parallel with each other. A main switch circuit block 10 is made of the switching components Q1 through Q3 and the diodes D1 through D3 in the first and second switch arms. A method of controlling the switching components Q1 through Q3 will be described later.

The AC power supply AC is connected, via an inductor L1, to the junction between the connection point of the diodes D11 and D12 in the rectifier arm and the connection point of Q1 and Q2 in a first switch arm. The inductor L1 contributes to reduction of sine waveform distortion (power factor correction), caused by rectification with rectifier arm, and boost operation performed for power factor correction operation by the switching components Q1 through Q3.

A first switch arm is connected in parallel with a series circuit including an inductor L2, a primary winding N1 of a transformer T1, and a capacitor C2.

A transformer T1 has a secondary winding N2, electromagnetic-coupled with the primary winding N1. The secondary winding N2 is connected in parallel with a serial circuit of a diode D5 and a diode D6 and a serial circuit of an inductor L3 and an inductor L4, where the diodes D5 and D6 are connected at anode electrode each other.

A capacitor C3 and a load RL are connected in parallel between a connection point of the inductors L3 and L4 and a connection point of the diodes D5 and D6.

A current doubler circuit is formed of the diodes D5 and D6, the inductors L3 and L4 and the capacitor C3 at the secondary winding of the transformer T1.

With above diagram, AC power from the AC power supply AC is converted to DC power through the inductor L1, the rectifier arm of the diodes D11 and D12, the main switch circuit block 10 including the switching components Q1 through Q3 and the diodes D1 through D3 and the capacitor C1. The frequency and voltage of AC power is controlled by the main switch circuit block 10.

Next, the DC power is converted to AC power by the main control circuit block 10 including the switching components Q1 through Q3 and the diodes D1 through D3, the capacitors C1 and C2, the inductor L2 and the primary winding N1.

The AC component is extracted by the LC serial circuit of the inductor L2 and the capacitor C2 (inclusive inductance of the primary winding N1 also), and this AC component is added to the primary winding N1 of the transformer T1.

In addition, AC power inputted to the primary side of the transformer T1 is converted and transmitted to AC power outputted from the secondary side of the transformer T1, where the primary winding N1 and the secondary winding N2 of the transformer T1 are electromagnetic-coupled. Here, ratio of AC voltages at secondary side and primary side are almost in proportion to turn ratio of the secondary winding N2 and the primary winding N1 (N2/N1).

AC power outputted from the secondary side of the transformer T1 is again converted to DC power, by rectifier and smoothing circuit including the diodes D5 and D6, the capacitor C3 and the inductors L3 and L4.

Above are main circuits of power converter to do AC/DC conversion.

Here, a combination of the main switch circuit block 10, the capacitor C1 and the inductor L1 also works as a power factor correction converter to improve a drop of power factor for the AC power supply AC, caused by harmonic currents in rectification by the rectifier arm, where the main switch circuit block 10 includes the switching components Q1 through Q3 and the diodes D1 through D3.

Additionally, the main switch circuit block 10 is a part of DC/DC converter from DC power accumulated in the capacitor C1 to DC power in the capacitor C3 at secondary side of the transformer T1, where the main switch circuit block 10 includes the switching components Q1 through Q3 and the diodes D1 through D3.

In other words, the main switch circuit block 10 is a partial circuit of the power factor correction converter and also the DC/DC converter. Therefore the main switch circuit block 10 is shared without clear boundary between the power factor correction converter and the DC/DC converter. The power converter in FIG. 1 is classified as the single-stage converter.

Above is the diagram of main circuit of the power converter, and the diagram of control circuit for controlling the power converter will be explained below.

<Control Circuit of the Power Converter>

On-off control of the switching components Q1 through Q3 in the main switch circuit block 10 is executed via a driving circuit 75.

Q1-Duty, Q2-Duty and Q3-Duty signals are provided from a driving signal generating circuit 97 to the driving circuit 75, and control the switching components Q1 through Q3 with PWM (Pulse Width Modulation) control.

The driving signal generating circuit 97 receives output signals from each of a positive-negative decision circuit 76, a PWM signal generating circuit 94 in a power factor correction control circuit 90 and a PWM signal generating circuit 96 in a output voltage control circuit 95. Each of these circuits, producing output signals, will be explained one after another.

The driving circuit 75, the drive signal generating circuit 97, the positive-negative decision circuit 76, the output voltage control circuit 95, the power factor correction control circuit 90 and an intermediate voltage control circuit 101 (to be explained later) will be collectively called the control circuit.

<<Positive-Negative Decision Circuit 76>>

The positive-negative decision circuit 76 outputs a signal according to the output signal from an input voltage detection circuit 71 which detects the input voltage of the AC power supply AC, and outputs a signal for "H" during the half-cycle of the voltage being positive and a signal for "L" during the half-cycle of the voltage being negative.

<<Output Voltage Control Circuit 95>>

An output voltage detection value, detected by an output voltage detection circuit 72 to detect a terminal voltage or an output voltage at the capacitor C3, and an output voltage command value at specific setting value are inputted into a comparison amplifier 77, for comparison and amplification. Then output voltage deviation Voduty is generated as an output signal and inputted into a PWM signal generating circuit 96. The PWM signal generating circuit 96 compares output voltage deviation Voduty and PWM carrier (generated inside of a PWM signal generating circuit), generates a PWM signal and outputs it.

The comparison amplifier 77 and the PWM signal generating circuit 96 above construct the output voltage control circuit 95.

<<Power Factor Correction Control Circuit 90, Part 1>>

The power factor correction control circuit 90 includes an absolute value circuit 92, a coefficient circuit 99, a comparison amplifier 79, an adder 98 and the PWM signal generating circuit 94. The coefficient circuit 99 is expressed as "Coefficient" in FIG. 1.

Here, the adder 98 has an input Vd_bias as an output signal from a comparison amplifier 102 in the intermediate voltage control circuit 101, so the diagram of the intermediate voltage control circuit 101 will be explained first.

<<Intermediate Voltage Control Circuit 101>>

An output current detection value, detected by a current sensor 80 and an output current detection circuit 81 to detect output (load) current flowing through the load RL, is inputted into a command value compensation circuit 104.

The command value compensation circuit 104 generates the compensation value to compensate the intermediate voltage command value, based on the output current detection value.

The generated compensation value is inputted into an adder 103, together with the intermediate voltage command value, and they are added to generate a new intermediate voltage command value Vd_cmp.

The intermediate voltage deviation Vd_bias is generated as an output signal by the comparison amplifier 102, based on the intermediate voltage detection value, detected by an intermediate voltage detection circuit 100 to detect a terminal voltage or an intermediate voltage at the capacitor C1, and a new intermediate voltage command value Vd_cmp.

The command value compensation circuit 104, the adder 103 and the comparison amplifier 102 construct the intermediate voltage control circuit 101.

<<Power Factor Correction Control Circuit 90, Part 2>>

Explanation for the power factor correction control circuit 90 will be resumed.

An input current detection value, detected at a current sensor 73 and an input current detection circuit 74 for detecting input current, is inputted into the absolute value circuit 92 for converting to an absolute value.

On the other hand, the output voltage deviation Voduty, generated by the comparison amplifier 77 in the output voltage control circuit 95, is inputted into the coefficient circuit 99 and multiplied with a specific coefficient to generate an input current command value. Here, an output voltage command value and an input current command value need to have close relationship, and that is why an input current command value is generated based on the output voltage deviation Voduty, which is generated in relevant to output voltage command value, and multiplied with coefficient.

This input current command value and the absolute value of input current detection value are inputted into the comparison amplifier 79. The comparison amplifier 79 compares their difference, amplifies the difference value, then generates and outputs an input current deviation Vdduty.

The adder 98 receives and adds the input current deviation Vdduty and the intermediate voltage deviation Vd_bias, which is output from the comparison amplifier 102 in the intermediate voltage control circuit 101, then generates a new input current deviation Vdduty'.

The PWM signal generating circuit 94 compares the new input current deviation Vdduty' with a PWM carrier, generated within the PWM signal generating circuit 94, and generates a PWM signal.

Here, the PWM signal generating circuit 94 in the power factor correction control circuit 90 and the PWM signal generating circuit 96 in the output voltage control circuit 95 are synchronized by a synchronous signal, operate in close relationship with each other and input each of output signals to the drive signal generating circuit 97.

Each of output signals from the positive-negative decision circuit 76, the PWM signal generating circuit 96 (a first PWM signal generating circuit) and the PWM signal generating circuit 94 (a second PWM signal generating circuit) is inputted into the drive signal generating circuit 97.

<<Drive Signal Generating Circuit 97>>

Here is explanation about the diagram of the drive signal generating circuit 97.

The drive signal generating circuit 97 includes a first through a fourth AND (logical multiply) circuits, a first and a second OR (logical add) circuits and a NAND (negative AND) circuit.

The second gate of the first AND circuit and the first gate of the second AND circuit receive an output signal from the PWM signal generating circuit 94. The first gate of the first AND circuit and the second gate of the second AND circuit receives an output signal from the positive-negative decision circuit 76, except that the second gate of the second AND circuit receives an inverted signal.

Also the second gate of the third AND circuit and the first gate of the fourth AND circuit get an output signal from the PWM signal generating circuit 96. The first gate of the third AND circuit and the second gate of the fourth AND circuit receives an output signal from the positive-negative decision circuit 76, except that the first gate of the third AND circuit receives an inverted signal.

The first OR circuit receives an output signal from the first AND circuit at the first gate, and an output signal from the third AND circuit at the second gate.

The second OR circuit receives an output signal from the second AND circuit at the first gate, and an output signal from the fourth AND circuit through the second gate.

The NAND circuit receives an output signal through first gate of the first OR circuit, and an output signal through the second gate of the second OR circuit.

The first OR circuit outputs Q1-Duty signal, the second OR circuit outputs Q2-Duty signal and the NAND circuit outputs Q3-Duty signal.

Here, the first gate of the first AND circuit and the second gate of the fourth AND circuit receive an output signal from the positive-negative decision circuit 76 which is not inverted, but the second gate of the second AND circuit and the first gate of the third AND circuit receive an output signal from the positive-negative decision circuit 76 after inversion, so signals from the Q1-Duty and the Q2-Duty exchange each other, corresponding to half-cycles of positive voltage polarity and negative voltage polarity of the AC power supply AC <Drive Signal Waveforms at the Switching Components Q1 Through Q3>

Next is explanation about drive signal waveforms at the switching components Q1 through Q3.

Figure 2:
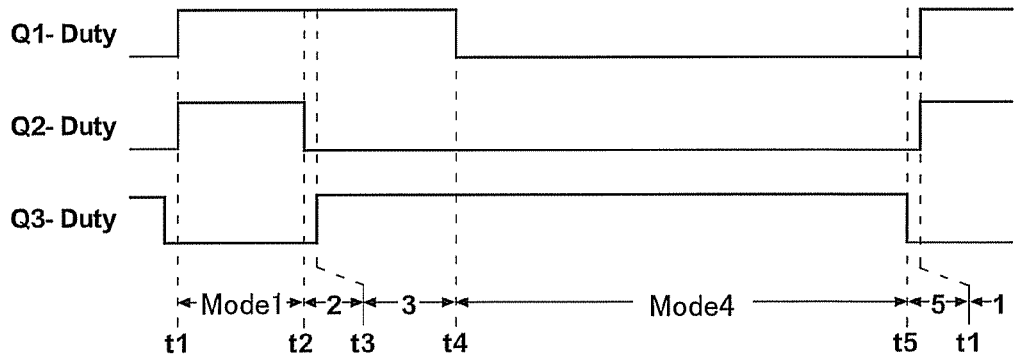
FIG. 2 shows a time chart for driving signal waveforms at switching components Q1 through Q3 of the power converter of the first embodiment of the invention.

FIG. 2 is a time chart to show drive signal waveforms (Q1-Duty, Q2-Duty and Q3-Duty) out of the switching components Q1 through Q3. In FIG. 2, the lateral direction shows time and operation modes with time, and the longitudinal direction shows Q1-Duty, Q2-Duty and Q3-Duty.

In FIG. 2, drive signal waveforms at the switching components Q1 through Q3 correspond to "H" or positive voltage polarity at the AC power supply AC. The switching components Q1 and Q2 in the first switching arm are made on and off, and a drive signal is generated to make the switching component Q3 in the second switching arm on, during either one of the switching component Q1 or Q2 with shorter length of time while its signal is "on" is "off".

This operation is performed on the PWM control changing from time to time with appropriate interval and timing, so that operation at a power factor correction converter and a DC/DC converter go together, by making the switching components Q1 through Q3 in the main switch circuit block 10 on and off.

During a half-cycle for "L" with negative voltage polarity, the drive signal waveforms Q1-Duty and Q2-Duty in FIG. 2 exchange each other. Control is made for each half-cycle of "H" or "L", corresponding to the positive or the negative voltage polarity of the AC power supply AC out of the positive-negative decision circuit 76.

A more detail operation will be described later.

<Control Operation by Control Circuit>

Next, control operation at the first embodiment will be explained with reference to FIG. 3 and FIG. 4.

Figure 3:
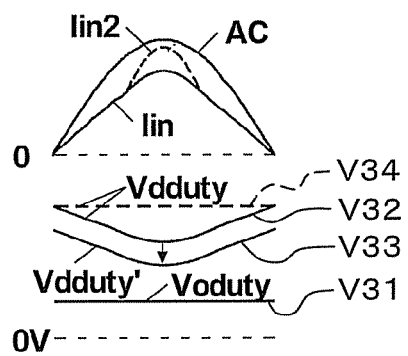
FIG. 3 shows a chart for control operation of a power converter of the first embodiment of the invention in FIG. 1.

FIG. 3 illustrates the control operation of the first embodiment shown in FIG. 1.

In FIG. 3, two characteristics charts are aligned together, one for operation waveforms of the input voltage and the input current from AC power supply, marking voltage at the AC power supply AC as AC and the input current as Iin (or Iin2), and the other for each of the control voltage Voduty generated by the comparison amplifier 77 (output voltage deviation), the control voltage Vdduty generated by the comparison amplifier 79 (input current deviation) and the control voltage Vdduty' generated by the adder 98 (new input current deviation).

In the upper portion of FIG. 3, each operation waveform for voltage of the AC power supply AC and for the input current Iin and Iin2 are illustrated on the same time base. The baseline of the AC voltage AC and the input current Iin and Iin2 are marked as "0", shown with a broken line. It is just shown as "0" without a unit parameter because units for AC voltage and input current are different.

The input current projecting upward at around the peak value of the voltage at AC power supply is illustrated as Iin2, as it will be explained later.

At the lower side of FIG. 3, the control voltage Voduty (output voltage deviation) is the signal within the output voltage control circuit 95 (ref; FIG. 1), and the control whereby will be referred to as "Output voltage control" V31.

Control voltage Vdduty (input current deviation) illustrated with a solid line and a broken line is the signal within the power factor correction control circuit 90 (ref; FIG. 1), and the control whereby will be referred to as "Power factor correction control" (V32 for the solid line and V34 for the broken line).

Control voltage Vdduty' (new input current deviation) is also the signal within the power factor correction control circuit 90 (ref; FIG. 1), but shifted in parallel from control voltage Vdduty (input current deviation), by the amount of the signal of intermediate voltage deviation Vd_bias in the intermediate voltage control circuit 101, and the control whereby will be referred to as "Intermediate voltage control" V33.

The input current deviation Vdduty and the new input current deviation Vdduty' are signals relating to deviation in the input current, but are designated with voltages as control voltage (input current deviation) Vdduty and control voltage (new input voltage deviation) Vdduty', because control is made with voltage values obtained by converting current value ratio to voltage value ratio.

The reference point for Vdduty, Vdduty' and Voduty is illustrated as "0V" at the lower side of FIG. 3, shown with a broken line. Voltages for Vdduty, Vdduty' and Voduty correspond to the time base for operation waveforms of AC power voltage AC, the input current Iin and Iin2.

More details will be explained later for characteristics in FIG. 3.

Figure 4:
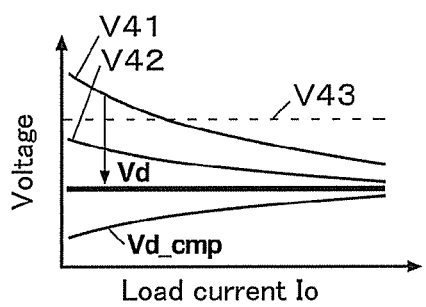
FIG. 4 shows a chart for the relationship between load current Io and intermediate voltage Vd of a power converter of the first embodiment of the invention for three cases: "Conventional control", "No intermediate voltage control" and Vd (Intermediate voltage control) in heavy line.

FIG. 4 shows relationship between the load current I0 and the intermediate voltage, with characteristics for the conventional control (V41), for the control with the invention but without intermediate voltage control (V42) and "Vd" (control with the invention and with the intermediate voltage control) in heavy line.

In FIG. 4, the horizontal axis is for the load current I0 and the vertical axis for the intermediate voltage.

Additionally, component breakdown voltage level V43 and "Vd_cmp", new intermediate voltage command value to keep intermediate voltage Vd at reasonable value, are illustrated for reference.

More details will be explained later for characteristics in FIG. 4.

In the first embodiment, the input current deviation Vdduty for power factor correction control needs to be equal or higher than the output voltage deviation Voduty for output voltage control, as shown in FIG. 3, in order to establish the control over the switching components for both of the power factor correction control (inclusive intermediate voltage control) and the output voltage control.

By keeping this relationship, voltage fluctuations in the output voltage and the intermediate voltage are small and a sign waveform of the input current has only small distortion.

In order to realize above, operation by Output voltage control, Power factor correction control and Intermediate voltage control will be explained, using FIG. 3 and FIG. 4. Explanation will be made when a half-cycle of the AC power supply AC has the positive voltage polarity.

<Output Voltage Control>

With output voltage control V31, in FIG. 3, by the output voltage control circuit (95 in FIG. 1), the PWM signal is generated to drive the switching components Q2 and Q3, based on the output voltage deviation Voduty, which is generated from the output voltage command value and the detected output voltage Vo, in order to stabilize the output voltage.

Control is made with the PWM signal to keep the output voltage at specific setting value. In this case, the switching component Q2 is driven based on the ON-width (length of time while its signal is on) of the PWM signal corresponding to Voduty.

<Power Factor Correction Control>

With power factor correction control V32, in FIG. 3, by the power factor correction control circuit (90 in FIG. 1), control is made in a discontinuous mode in the small current region of the input current at a region around zero voltage of the AC power supply AC, shifting to continuous mode as it changes to the large current region, in order to get a sign waveform of the input current based on the voltage change at the AC power supply AC.

In order to get a sign waveform of input current, the relationship between the input current deviation Vdduty and the output voltage deviation Voduty always needs to be Vdduty>=Voduty. The input current deviation Vdduty is generated based on the input current command value and the detected input current Iin, where the input current command value is made by multiplying coefficient Kc by Voduty.

With above control, the input current deviation Vdduty becomes convex downward, as V32 case in FIG. 3. In this case, the switching component Q1 is driven by the PWM signal, corresponding to Vdduty.

Here, the input current deviation Vdduty becoming convex downward means that control is making the input current deviation Vdduty lower and the ON-width of PWM signal narrower as the input current Iin becomes higher.

On the contrary, Vdduty has a limited value less than 1 but not zero at around zero voltage of the AC power supply AC where the input current becomes low, with downward convex shape, and the ON-width of PWM signal becomes wider.

When the voltage of the AC power supply AC (ref; FIG. 1) is applied to the Inductor L1 (ref; FIG. 1) with this wide ON-width of PWM signal, the voltage of the AC power supply AC is close to zero. Therefore the envelope of current at the inductor L1 or the input current Iin does not depend on the Vdduty value but the voltage of AC power supply, and as a result, it gradually increases from 0 (Ampere), as shown with Iin in FIG. 3.

When the voltage of the AC power supply AC is near the peak value due to high input current, the input current deviation Vdduty is around the bottom of downward convex, as V32 case in FIG. 3, and the Vdduty value becomes lower than when the input current is low.

With such control, the ON-width of PWM signal becomes narrow and duration of time the inductor L1 is applied with voltage of the AC power supply AC becomes short. Therefore the change width of saw-tooth wave current (derived from PWM control) of the input current Iin is suppressed to lower level, even when voltage of the AC power supply AC is high, because current at the inductor L1 is limited with time for the ON-width of PWM signal.

This leads to suppress the peak value of envelope for the input current Iin to lower level, as illustrated with solid line in the upper chart in FIG. 3.

The reason that high power can be supplied by suppressing the change width of saw-tooth wave current of the input current Iin to lower level is because saw-tooth wave current component of the input current Iin is superimposed on the DC current (direct current component).

From above, this control is not discontinuous mode but continuous mode.

This control method will be compared with a case that discontinuous mode is applied for all voltage areas of the AC power supply AC. In discontinuous mode, the input current deviation Vdduty has a constant value, as illustrated with a dotted line (V34 case in FIG. 3). Therefore when the current is high at around peak value of voltage of the AC power supply AC, the inductance value becomes low and saturates then the input current Iin, illustrated with a solid line, projects high as Iin2, as illustrated with a dotted line in the upper chart in FIG. 3, if the same inductor is used as the inductor L1 for control of the invention.

When the input current Iin projects high as above, a high current is blocked off and loss at switching component becomes large. In order to reduce this loss and achieve high efficiency, it is expedient to change discontinuous mode to continuous mode and suppress change of input current Iin, then the control method of this embodiment is appropriate.

Also, in discontinuous mode in small current region and shifting to continuous mode as it becomes large current region, the envelope of input current Iin becomes close to a sign waveform, as illustrated with a solid line in the upper chart in FIG. 3, and power factor correction is possible for total voltage area of the AC power supply AC and high power factor (more than 98%) can be expected.

<Intermediate Voltage Control>

Intermediate voltage control controls an intermediate voltage constantly at specific setting value for full load area.

For a comparison purpose, a case will be shown, wherein the intermediate voltage is not controlled with conventional single-stage power converter. In this case, the intermediate voltage goes up as the load becomes light, as illustrated with characteristic line of V41 in FIG. 4, then it exceeds the normal component breakdown voltage level V43 of an electrolytic condenser, so a high breakdown voltage level condenser is required.

Next will be the case, as described under <Power factor correction control> above, with the invention but no intermediate voltage control to drive the switching component Q1 by the PWM signal, which is to be generated using the input current deviation Vdduty (V32 case in FIG. 3).

In this case, an intermediate voltage will be like characteristic line V42 in FIG. 4, where the intermediate voltage does not go over the component breakdown voltage level V43 but it goes up as load becomes light.

In order to control the intermediate voltage at constant setting value without depending on the load, rising at characteristic line V42 needs to be cancelled (or compensated) by generating compensation curve illustrated as Vd_cmp in FIG. 4.

For this purpose, the value at compensation curve Vd_cmp in FIG. 4 is generated as a new intermediate voltage command value Vd_cmp (ref; FIG. 1), by subtracting the compensation value generated by the command value compensation circuit 104 (ref; FIG. 1) from the intermediate voltage command value (ref; FIG. 1). Based on this generated Vd_cmp and the detected intermediate voltage detection value Vd, the intermediate voltage deviation Vd_bias is generated from the comparison amplifier 102 (ref; FIG. 1).

Adding this Vd_bias to the input current deviation Vdduty (ref; the adder 98 in FIG. 1) and shifting the characteristic line in V32 case to the line in V33 case in FIG. 3, a new input current deviation Vdduty' (ref; FIG. 1 and FIG. 3) is generated. Based on this Vdduty', the PWM signal is generated by the PWM signal generating circuit 94 (ref; FIG. 1) to drive the switching component Q1.

With generation of this new input current deviation Vdduty' signal, the intermediate voltage Vd is controlled constantly at requested setting value without depending on the load, as illustrated with a heavy line in FIG. 4.

As described before, the command value compensation circuit 104 (ref; FIG. 1) is for generating compensation value to compensate the intermediate voltage command value (ref; FIG. 1) based on the output current detection value (ref; FIG. 1). In order to change an intermediate voltage command value following the load current, the characteristic line (curve line) for Vd_cmp needs to be generated from the intermediate voltage command value. For this purpose, the value at solid line in FIG. 4 is subtracted from the value at characteristic line V42 and the resulting value is used as the compensation value at the command value compensation circuit 104.

This characteristic line can be expressed with quadratic functions or cubic functions. The control circuit in FIG. 1 is explained with the analog control, but the digital control is better suited for quadratic functions or cubic functions. If the digital control is used, compensation data can be used instead of such functions.

Above is the generation method of compensation value for a command value compensation circuit to control the intermediate voltage constantly at desired value, without depending on the load current. But the target value of general intermediate voltage has an allowable range, so if the intermediate voltage can be controlled to stay within the range at any load current, this case is also regarded that the intermediate voltage is controlled constantly at desired value. In this case, the command value compensation circuit 104 requires at least one compensation value, so the circuit can be made simple.

Explanation for the embodiment of the invention above is applicable when the voltage polarity of the AC power supply AC is positive, where the switching component Q1 is positioned as the main component for the input current waveform control or the power factor correction control, and the switching component Q2 as the main component for the output voltage control.

Each switching component is assigned with different function, thus achieving both functions of the input current waveform control and the output voltage control.

Here, when the voltage polarity of the AC power supply AC is negative, the same performance is achieved, by exchanging functions of the switching components Q1 and Q2.

In order to have same characteristics even when the switching components Q1 and Q2 exchange their functions, another inductor corresponding to the inductor L1 is provided in fact, even though it is not shown, between the opposite terminal of the AC power supply AC, from the terminal connected to the inductor L1, and a connection point of the switching component Q1 and the switching component Q2. As such, the circuit diagram is symmetric to have same characteristics when voltage polarity of the AC power supply AC is either positive or negative.

Function exchange of the switching component Q1 and the switching component Q2 is made such that the positive-negative decision circuit 76 in FIG. 1 makes decision on the voltage polarity then that signal controls a logic circuit in the drive signal generating circuit 97.

With above control operation, the PWM signal generating circuits 94 and 96 output PWM signals in synchronization with each other by the synchronization signal, and the drive signal generating circuit 97 generates drive signals Q1-Duty, Q2-Duty and Q3-Duty, illustrated in FIG. 2, for the switching components Q1 through Q3, based on outputs from the PWM signal generating circuits 94, 96 and the positive-negative decision circuit 76.

This embodiment controls the switching components Q1 and Q2, with a higher priority for the output voltage control circuit 95 than for the power factor correction control circuit 90. As such, the output voltage control is done first, followed by the power factor correction control inclusive the intermediate voltage control.

With such diagram, the output voltage (the terminal voltage of C3) stabilizes, because the switching components Q1 and Q2 control the output voltage control circuit with a higher priority. As a result of stabilized output voltage, distortion at the input current Iin (Iin2) is suppressed as the solid line envelope in FIG. 3. The intermediate voltage is also controlled at constant setting value, as illustrated in heavy line in FIG. 4, without depending on the load.

<Main Circuit Operation for Each Mode>

Next, the main circuit operation of the first embodiment will be explained for each mode, by using timing of the driving signal waveforms Q1-Duty, Q2-Duty and Q3-Duty in FIG. 2 for each of the switching components Q1 through Q3, when the voltage polarity of the AC power supply AC is positive.

The switching components Q1 through Q3, the AC power supply AC, the inductors L1 through L4, the primary winding N1 and the secondary winding N2 of the transformer T1, the diodes D1 through D3, D5, D6, D11 and D12, and the capacitors C1 through C3 will be expressed simply as Q1 through Q3, AC, L1 through L4, N1, N2, D1 through D3, D5, D6, D11, D12 and C1 through C3 as appropriate.

<Mode 1, (t1 to t2)>

First, when the switching component Q1 and the switching component Q2 are ON-state, the current flows to the inductor L1 to accumulate energy on a path of AC-L1-D11-Q1.

The current flows to accumulate energy at primary side of the transformer T1 by accumulation charge at the capacitor C2 on a path of C2-N1-L2-Q1-Q2.

As the current flows at primary side of the transformer T1, the current flows at secondary side on a path of N2-L4-C3-D5, corresponding to the charged energy above at the transformer T1, then power is provided to output side.

In this embodiment, as described previously, control is made with the switching component Q1 as the main component for the input current waveform control and the switching component Q2 as the main component for the output voltage control.

Therefore the power factor correction control and the output voltage control work under the condition that timing to turn off Q1 is later than timing to turn off Q2. More specifically, the output voltage is controlled when both of the switching component Q1 and the switching component Q2 are ON-state, and the input current waveform is controlled when Q is ON-state and Q2 is OFF-state.

<Mode 2, (t2 to t3)>

Next, when Q2 is turned off at timing of t2, the return current flows on a path of L2-D3-C1-C2-N1, by accumulated energy at the inductor L2.

<Mode 3, (t3 to t4)>

During the time (t2 is off), when Q3 is turned on at timing t3, the return current flows on a path of L2-Q3-C1-C2-N1, so Q3 becomes an synchronous rectification operation. Therefore the conduction loss becomes small when a superjunction MOSFET is used, which has a high breakdown voltage and a low on-resistance. As Q3 turns on when D3 is conducted or terminal voltage is zero, such operation is Zero Volt Switching (ZVS) and there is little or no turn-on power loss.

On the other hand, the current flows on a path of N2-L3-C3-D6 at secondary side of the transformer T1, by accumulated energy at the transformer T1, then power is supplied to output side. If accumulated energy at L2 becomes zero before Q1 is turned off, the current flows on a path of C1-Q3-L2-N1-C2, by accumulation charge at the capacitor C1.

<Mode 4, (t4 to r5)>

Next, when Q1 is turned off at timing t4, the current at L1 tries to continue to flow by accumulated energy at the inductor L1, but the current path is impeded by the inductor L2 which cannot make rapid current change, then the current flows on a path of L1-D11-Q3-C1-D2-AC. When the current at the inductor L2 reaches to the current at the inductor L1 after specific time, the current continues to flow on a path of AC-L1-D11-L2-N1-C2-D2 by accumulated energy at L1.

On the other hand, the current flows at the primary side of DC-DC converter on a path of C1-Q3-L2-N1-C2 by accumulation charge at the capacitor C1.

<Mode 5, (t5 to t1)>

Next, when Q3 is turned off at timing t5, the current flows on a path of L2-N1-C2-D2-D1 by accumulated energy at L2, and ZVS operation can be realized by turning on Q1 and Q2 during the time. After then, when the accumulated energy at L2 becomes zero, the energy is accumulated at L1 and T1 as previously described, then it goes back to Mode 1.

After this, operation is repeated while voltage polarity of the AC power supply AC is positive. While voltage polarity of the AC power supply AC is negative, Mode 1 through 5 above are repeated as well, by exchanging functions of switching components Q1 and Q2 each other.

As explained above, in addition to control over the output voltage, this embodiment controls the power factor correction, inclusive the intermediate voltage, in discontinuous mode while the input current is in the small current region and in continuous mode in the large current region, then the operation in continuous mode in the large current area contributes to reduce switching loss at power conversion, compared with a case in discontinuous mode in all current area.

Especially, according to this embodiment, the output voltage and the intermediate voltage stabilize and distortion of input current waveform can be suppressed also, by always keeping relationship of Vdduty>=Voduty, for the input current deviation Vdduty and the output voltage deviation Voduty, and with ON-OFF control of the switching component Q1 (or Q2), based on a new input current deviation Vdduty' which is addition of the input current deviation Vdduty and the intermediate voltage deviation Vd_bias.

Second Embodiment

Next, a second embodiment of a power converter of the invention will be explained.

Figure 5:
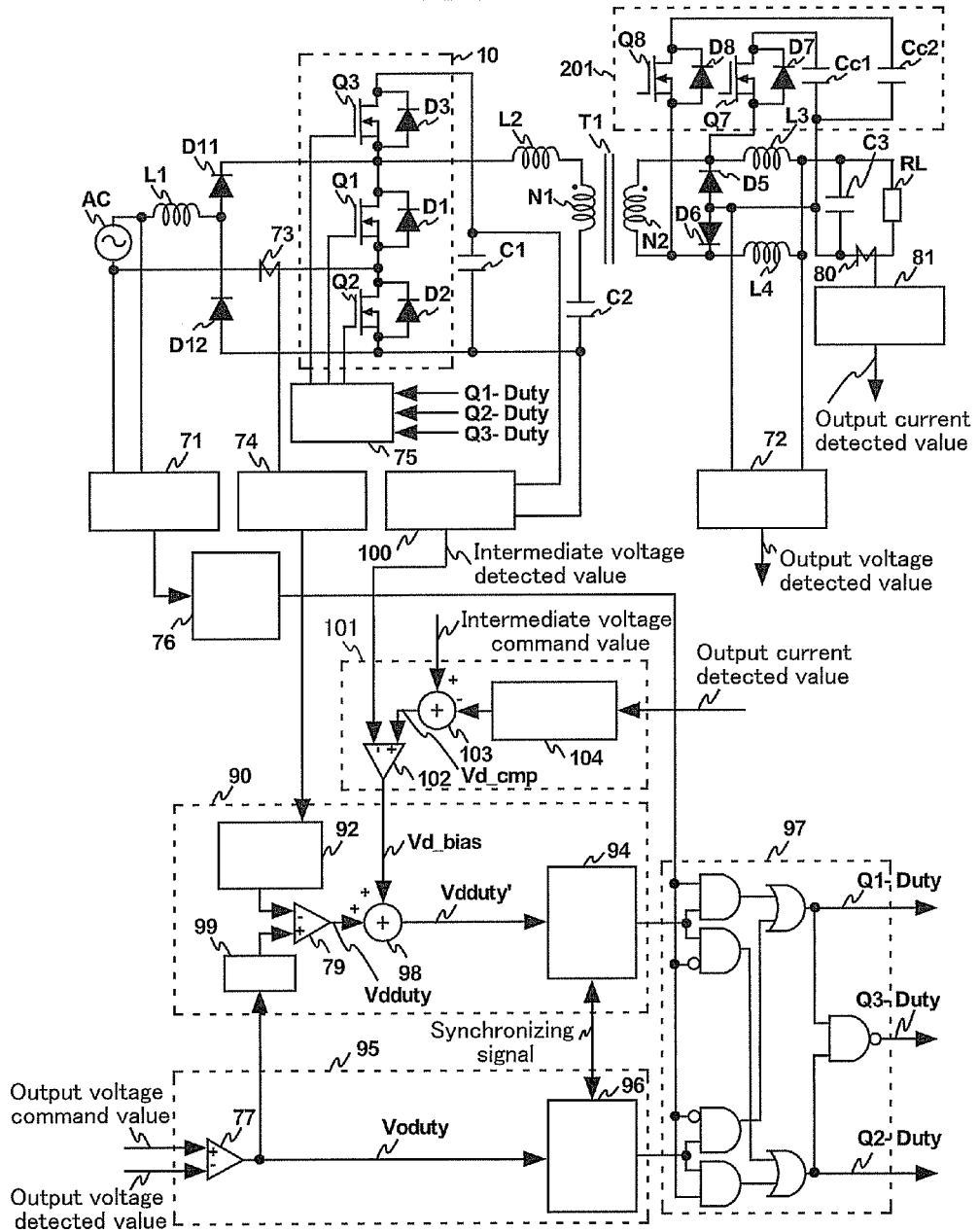
FIG. 5 shows a circuit diagram of a power converter of a second embodiment of the invention.

FIG. 5 is circuit diagram of the second embodiment of a power converter by the invention.

In FIG. 5, there is a difference from the first embodiment that an active clamp circuit 201 is further installed.

An active clamp circuit 201 includes two switching circuits and capacitors Cc1 and Cc2, where two switching circuits have reverse parallel connections including switching components Q7 and Q8 and diodes D7 and D8, respectively.

One terminal of each of the capacitors Cc1 and Cc2 is connected to the cathode electrode of each of the diodes D7 and D8, and the other terminal of each of capacitors Cc1 and Cc2 is connected, in common, to the connection point of the diodes D5 and D6.

The series circuit of two switching circuits in the active clamp circuit 201 is connected, in parallel, to the secondary winding N2. When the voltage polarity of the AC power supply AC is positive, the power converter by the second embodiment of the invention operates using timing of driving signal waveform for each of the switching components Q1 through Q3, Q7 and Q8 in FIG. 6.

Figure 6:
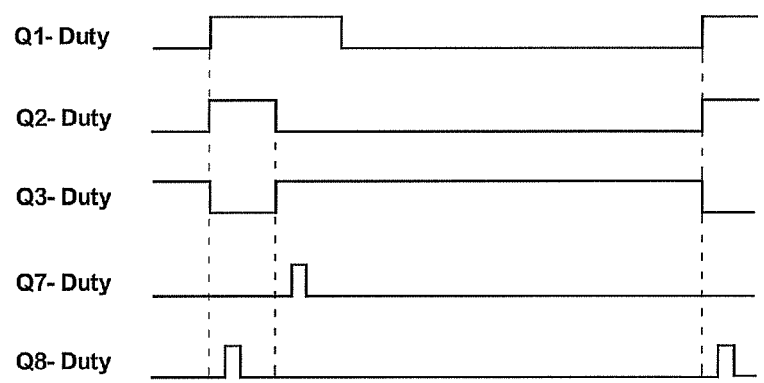
FIG. 6 shows a time chart for driving signal waveforms at switching components Q1 through Q3, Q7 and Q8 of a power converter of the second embodiment of the invention in FIG. 5.

FIG. 6 shows the time chart of driving signal waveforms at the switching components Q1 through Q3, Q7 and Q8 of the power converter by the second embodiment of the invention in FIG. 5.

At FIG. 6, the lateral direction shows time, and the longitudinal direction shows each of the driving signal waveforms Q1-Duty, Q2-Duty, Q3-Duty, Q7-Duty and Q8-Duty, where Q7-Duty and Q8-Duty are driving signal waveforms for the switching components Q7 and Q8 in the active clamp circuit 201, respectively, and Driving circuit for Q7 and Q8 is not shown in FIG. 5.

Operation waveforms for Q1-Duty, Q2-Duty and Q3-Duty are almost same as FIG. 2, which shows driving signal waveforms for the first embodiment of the invention. However, in FIG. 6, a pulse waveform is generated with Q7-Duty getting high during specific period of time while Q3-Duty is high and Q2-Duty is low. In addition, a pulse waveform is generated with Q8-Duty getting high during specific period of time while Q2-Duty is high and Q3-Duty is low.

With above diagram as well as operation by driving signal waveforms for the switching components Q1 through Q3, Q7 and Q8, the voltage inclusive ringing is clamped to terminal voltage at the capacitor Cc2 after ringing component is accumulated to the capacitor Cc2 via the diode D8, where ringing is caused by a parasitic inductor and a parasitic capacitor produced at the secondary winding N2 of the transformer T1 when the switching component Q2 is turned on.

When the switching component Q8 is turned on later, energy accumulated in the capacitor Cc2 is recovered by the capacitor C3 via the inductor L4.

On the other hand, the voltage inclusive ringing, caused by a parasitic inductor and a parasitic capacitor produced at the secondary winding N2 of the transformer T1 when the switching component Q3 is turned on, also accumulates energy at the capacitor Cc1, which is then recovered by the capacitor C3 via the inductor L3, together with the diode D7 and the switching component Q7.

Here, timings when the switching components Q7 and Q8 are turned on are better to be set after ringing at the secondary winding N2 disappears.

In the second embodiment, the active clamp circuit 201 can suppress the voltage for the diodes D5 and D6 at normal voltage arising at the secondary winding, so a diode with a high breakdown voltage, considering ringing voltage, is not needed. It also has an effect for improving efficiency, because energy accumulated at the capacitor Cc1 and Cc2 are recovered by the capacitor C3.

Same letters and numerals are assigned to the same elements as FIG. 1, and duplicate explanation was omitted for the same circuit diagram and operations.

Third Embodiment

Next, a third embodiment of a power converter by the invention will be explained.

Figure 7:
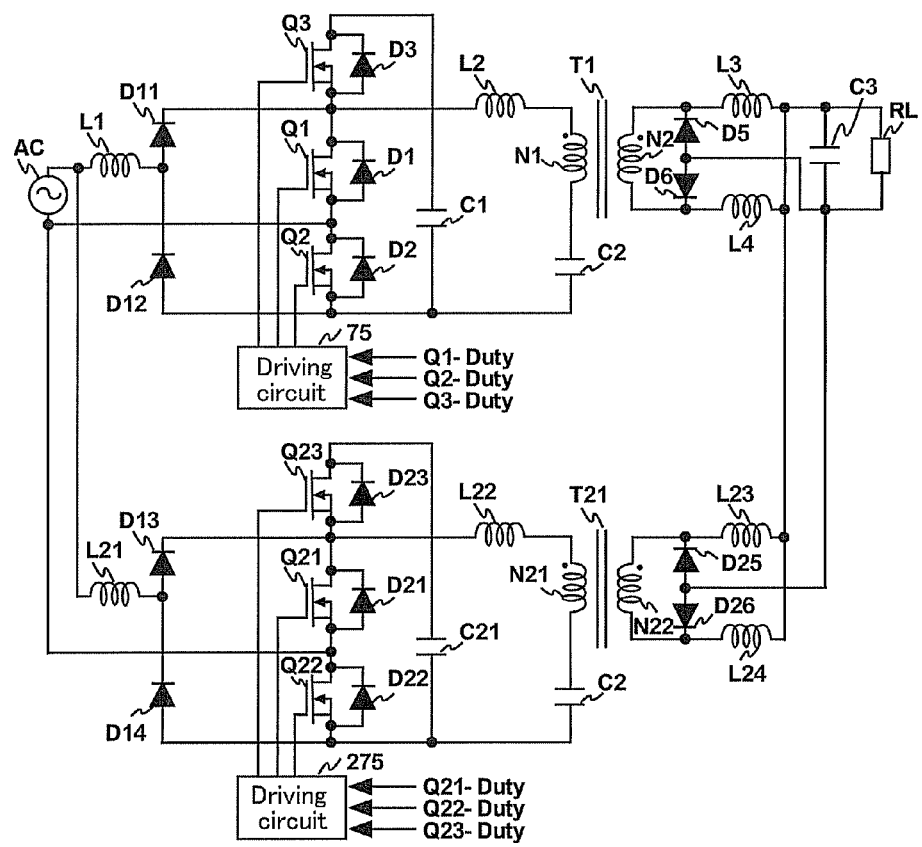
FIG. 7 shows a circuit diagram of a power converter of a third embodiment of the invention.

FIG. 7 is the circuit diagram of the third embodiment of a power converter with the invention.

At FIG. 7, a point that is different from the first embodiment is to have an additional power converter connected in parallel to the original one, for interleave operation (to operate complementarily and alternately) between two power converters, wherein the capacitor C3 is removed at the additional power converter and control circuits are not shown in FIG. 7.

Figure 8:
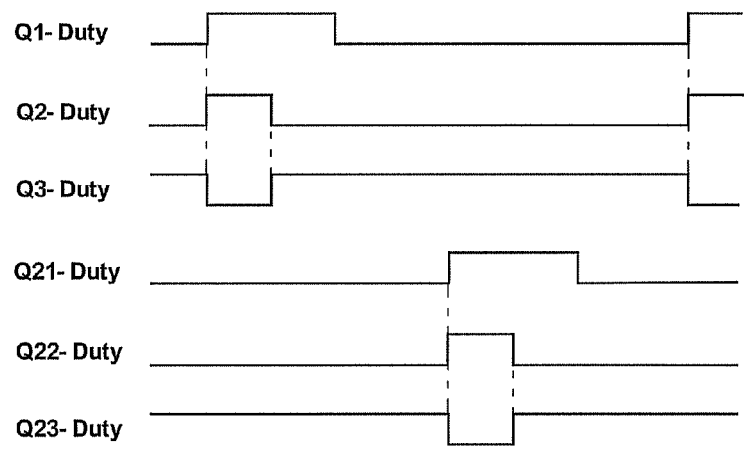
FIG. 8 shows a time chart for driving signal waveforms at switching components Q1 through Q3, Q21 through Q23 of a power converter of the third embodiment of the invention in FIG. 7.

The power converter by the third embodiment is operated by using timing of the driving signal waveform for each of the switching components Q1 through Q3, Q21 through Q23 in FIG. 8, while the voltage polarity of the AC power supply AC is positive.

At FIG. 7, control circuits (76, 90, 95, 97 and 101 in FIG. 1) and detection circuits (71 through 74, 80, 81 and 100 in FIG. 1) are omitted.

FIG. 8 shows a time chart of driving signal waveforms at the switching components Q1 through Q3 and Q21 through Q23 of the power converter by the third embodiment of the invention in FIG. 7.

At FIG. 8, the lateral direction shows time, and the longitudinal direction shows each of Q1-Duty, Q2-Duty, Q3-Duty, Q21-Duty, Q22-Duty and Q23-Duty.

Operation waveforms for Q1-Duty, Q2-Duty and Q3-Duty are almost same as FIG. 2, which shows driving signal waveforms for the first embodiment of the invention.

Driving signal waveforms are shown such that Q21-Duty gets high, Q22-Duty gets high and Q23-Duty gets low during specific period of time while Q1-Duty is low, Q2-Duty is low and Q3-Duty is high, in other words the switching components Q1 and Q2 are off. Driving signal waveforms for Q21-Duty, Q22-Duty and Q23-Duty during this period are same as those for Q1-Duty, Q2-Duty and Q3-Duty while the switching components Q1 through Q3 mainly work for a single-stage power converter.

Driving signal waveforms show that the switching components Q1 through Q3 and the switching components Q21 through Q23 operate alternately and complementarily in the same manner (interleave operation), but with shifted timing.

At FIG. 8, timing phases of the switching components Q21 through Q23 are shifted 180 degrees from timing phases for the switching components Q1 through Q3, for interleave operation.

According to the third embodiment, available load (electric power) can be high and more power factor correction and ripple reduction of terminal voltage (output voltage) at the capacitor C3 can be expected.

Same letters and numerals are assigned to the same elements as FIG. 1, and duplicate explanation was omitted for the same circuit diagram and operation.

Fourth Embodiment

Next, a fourth embodiment of a power converter by the invention will be explained.

Figure 9:
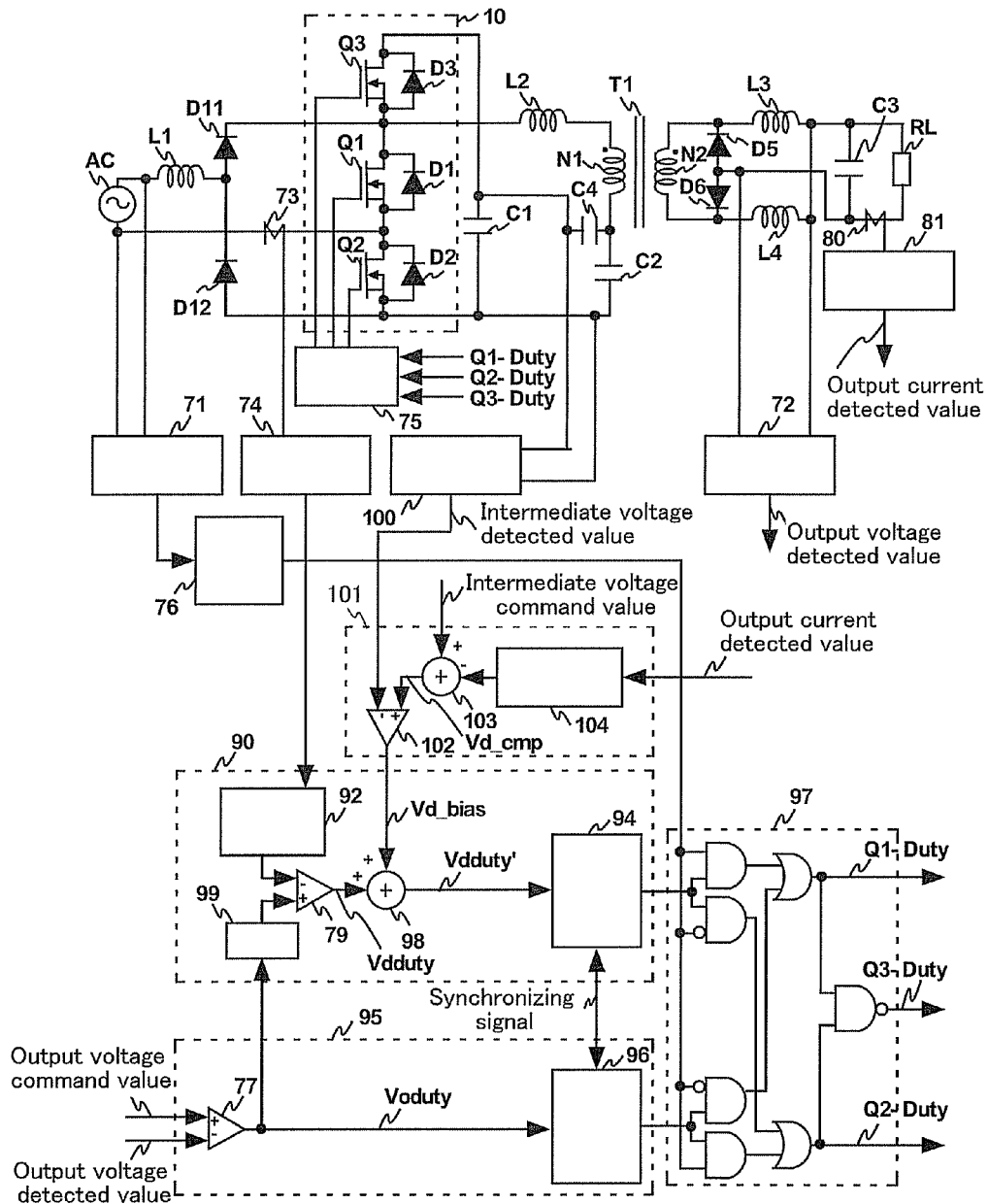
FIG. 9, shows a circuit diagram of a power converter of a 4th embodiment of the invention.

FIG. 9 is the circuit diagram of the fourth embodiment of a power converter by the invention.

At FIG. 9, the difference from the first embodiment is to have a capacitor C4 added between a connection point of the primary winding N1 of the transformer and the capacitor C2 and a connection point of the diode D3 and the capacitor C1, thus making primary side of the transformer as a half-bridge circuit.

Operation itself is same as the first embodiment, and same effects are gained as the first embodiment.

Same letters and numerals are assigned to the same elements as FIG. 1, and duplicate explanation was omitted for the same circuit diagram and operation.

Fifth Embodiment

Next, a fifth embodiment of a power converter by the invention will be explained.

Figure 10:
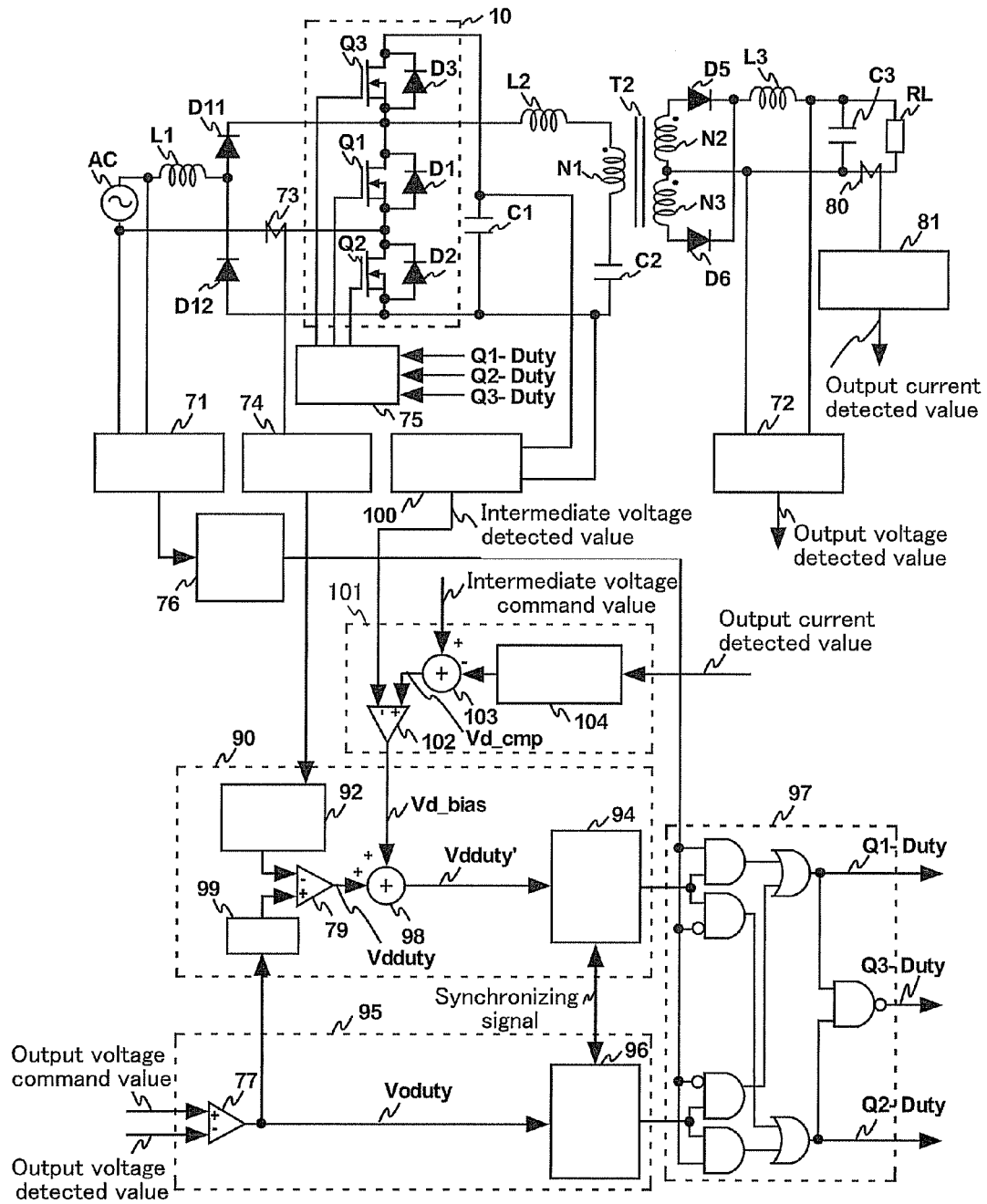
FIG. 10 shows a circuit diagram of a power converter of a 5th embodiment of the invention.

FIG. 10 is circuit diagram of the fifth embodiment of a power converter by the invention.

At FIG. 10, the difference from the first embodiment is to have two secondary windings of N2 and N3, making center tap diagram.

With this, the voltage at the secondary winding N2 is rectified by the diode D5, the voltage at the secondary winding N3 is rectified by the diode D6 and those are smoothed by the capacitor C3, via the inductor L3, then outputs DC current (electric power) at the load RL. Operation itself is same as the first embodiment, and same effects are gained as the first embodiment.

Same letters and numerals are assigned to the same elements as FIG. 1, and duplicate explanation was omitted for the same circuit diagram and operation.

Operation at the main switch circuit 10 can be made same as the first embodiment. The work of the inductor L3 here is to reduce ripple of output voltage (terminal voltage at a capacitor C3), getting stable output voltage with little ripple.

According to the fifth embodiment, same effects are gained as the first embodiment.

Same letters and numerals are assigned to the same elements as FIG. 1, and duplicate explanation was omitted for the same circuit diagram and operation.

Sixth Embodiment

Next, a sixth embodiment of a power converter by the invention will be explained.

Figure 11:
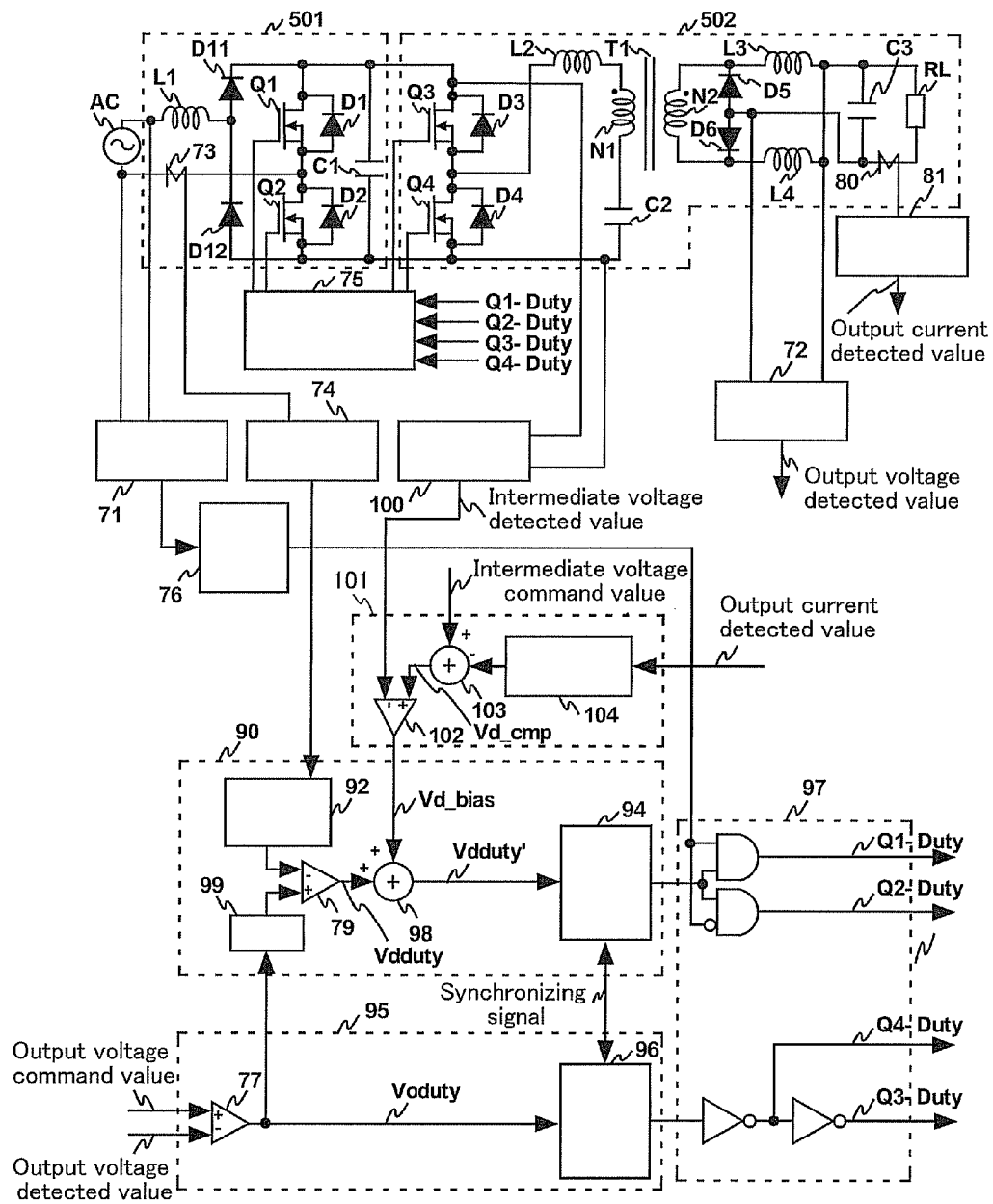
FIG. 11 shows a circuit diagram of a power converter of a 6th embodiment of the invention.

FIG. 11 is the circuit diagram of the sixth embodiment of a power converter by the invention.

At FIG. 11, the difference from the first embodiment is to apply control system of the invention to two-stage power converter (power factor correction converter and DC-DC converter).

Here, a power factor correction converter 501, among two-stage power converter, includes the inductor L1, two switching circuits having the diodes D11 and D12, the switching components Q1 and Q2 and the diodes D1 and D2, wherein each set of elements are connected in reverse parallel, and a booster circuit having the capacitor C1.

An insulated type DC-DC converter 502 includes a half-bridge circuit, which consists of two switching circuits having the switching component Q3, a switching component Q4, the diode D3 and a diode D4, wherein each set of elements are connected in reverse parallel, the inductor L2, the primary winding N1 of the transformer T1, and the capacitor C2, and a current doubler circuit, which consists of the secondary winding N2 of the transformer T1, the diodes D5 and D6, the inductors L3 and L4, and the capacitor C3.

Additionally, the logic gate diagram in the driving signal generating circuit 97 of control circuits is changed, as shown in FIG. 11.

The logic gate includes a first AND circuit, a second AND circuit, a first inverting circuit and a second inverting circuit, and the output signal from the PWM signal generating circuit 94 is inputted to the second gate of the first AND circuit and the first gate of the second AND circuit. The output signal from the positive-negative decision circuit 76 is inputted to the first gate of the first AND circuit and the second gate of the second AND circuit. Here, signal is put into the second gate of the second AND circuit after inversion.

The output signal from the PWM signal generating circuit 96 is inputted to the gate of the first inverting circuit. Output signal from the first inverting circuit is put into the gate of the second inverting circuit.

The output signal from the first AND circuit is Q1-Duty signal, the output signal from the second AND circuit is Q2-Duty signal, the signal from the first inverting circuit is Q4-Duty signal and the output signal from the second inverting circuit is Q3-Duty signal.

Figure 12:
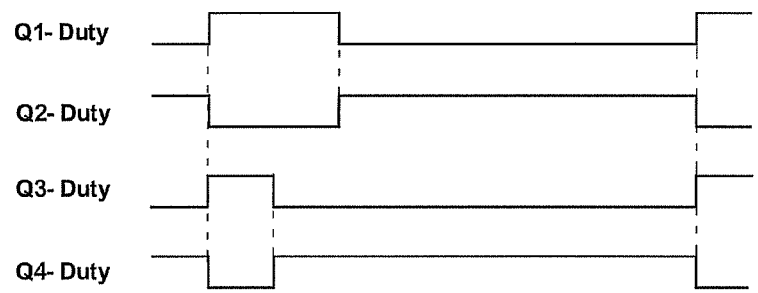
FIG. 12 shows a time chart for driving signal waveforms at switching components Q1 through Q4 of a power converter of the 6th embodiment of the invention.

FIG. 12 shows a time chart of driving signal waveforms at the switching components Q1 through Q4 of the power converter as the sixth embodiment of the invention in FIG. 11.

At FIG. 12, the lateral direction shows time, and the longitudinal direction shows each of Q1-Duty, Q2-Duty, Q3-Duty, and Q4-Duty.

Waveforms of Q1-Duty and Q2-Duty are inverted each other. Waveforms of Q3-Duty and Q4-Duty are inverted each other.

Q3-Duty gets high during specific period of time while Q1-Duty is low.

While the voltage polarity of the AC power supply AC is positive, a power converter by the sixth embodiment is operated by using timing of driving signal waveforms for each of the switching components Q1 through Q4 in FIG. 12.

While the voltage polarity of the AC power supply AC is negative, Q1-Duty and Q2-Duty in FIG. 12 work alternately.

In this case, waveforms of Q3-Duty and Q4-Duty are same as FIG. 12.

The sixth embodiment shows that not only it can gain the same level of effects as the first embodiment, but also the control method can be applied to a two-stage power converter as well. In other words, the control method of the invention was first explained for a single-stage power converter, but the control method can be applied not only to single-stage power converters but also to two-stage power converters or any power converters in general.

In case of a two-stage power converter, there is no priority relationship between the power factor correction control system, inclusive the intermediate voltage control system, and the output voltage control system, so control for the switching components Q1 and Q2 and the switching components Q3 and Q4 can be made independently in each of two control systems, then there is a merit that more flexible control system can be composed, compared to a single-stage power converter.

Same letters and numerals are assigned to the same elements as FIG. 1, and duplicate explanation was omitted for the same circuit diagram and operation.

Seventh Embodiment

Next, an embodiment of Hard Disk Drive (HDD) device using the power converter by the invention will be shown as a seventh embodiment.

Figure 13:
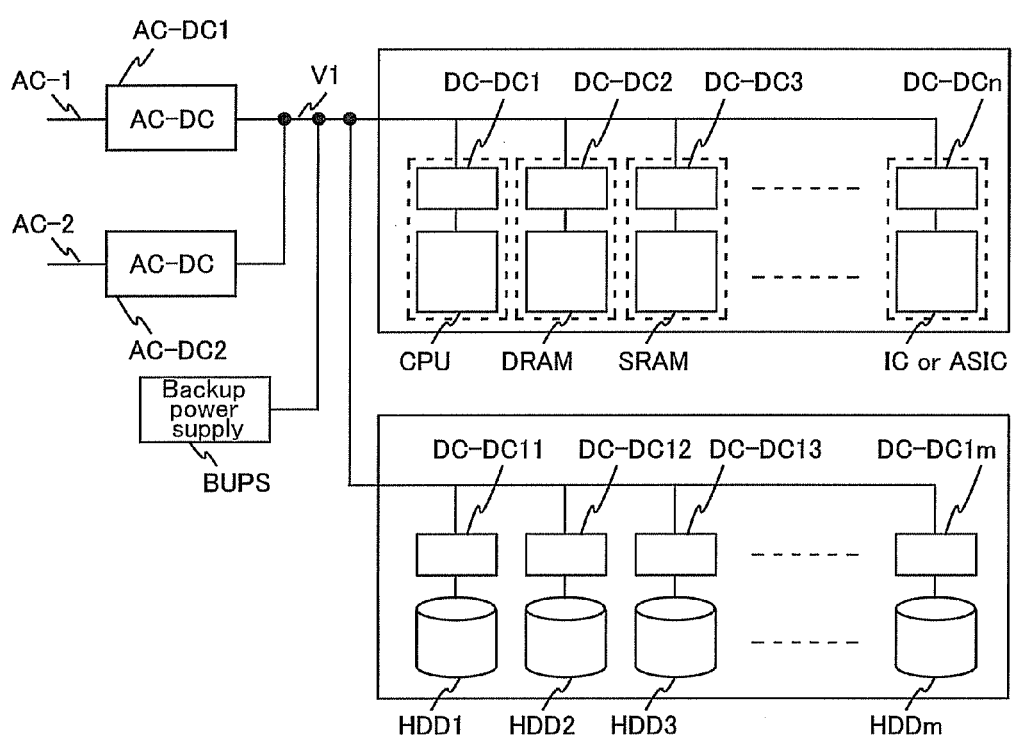
FIG. 13 shows a diagram of HDD device with a power converter by the invention.

FIG. 13 shows a diagram of HDD device to which a power converter of the invention is applied.

At FIG. 13, a power supply system for a HDD device, with parallel redundancy configuration, receives AC voltage through AC lines (AC power distribution lines), AC-1 and AC-2, and puts out DC voltage V1 via AC-DC converters, AC-DC1 and AC-DC2, which are power converters described as the first embodiment through the sixth embodiment.

DC voltage V1 is connected to back-up power supply BUPS, installed with batteries, in case of a power failure. This DC voltage V1 supplies power to HDD devices HDD1 through HDDm, via non-insulated DC-DC converters, DC-DC1 through DC-DCm.

Power is supplied also to each of circuit boards, including processor CPU to control storing data into HDD device, a high-speed and large-capacity memory DRAM (Dynamic Random Access Memory), a SRAM (Static Random Access Memory), an IC (Integrated Circuit) or an ASIC (Application Specific Integrated Circuit) and so forth, with different and appropriate voltage.

As the seventh embodiment, power supply systems or equipments using power converters explained at the first embodiment through the sixth embodiment can achieve low cost, by reducing number of component parts, or low loss, by reducing conduction loss, then compact, low cost and high efficient power systems or various kinds of appliances like HDD devices can be acquired. Also high power factor can be expected from AC line (AC power distribution line) viewpoint, by applying power factor control for power converters of the invention.

Other Embodiments

Embodiments of the invention were described in detail above, using figures, but the invention is not limited to these embodiments or modifications and design changes can be possible within the concept and the scope of this invention, followed by some examples.

For example, the inductor L2 was used at the first embodiment (ref; FIG. 1), but L2 can be replaced by leakage inductance at the transformer T1. This modification can be applied also to the second through sixth embodiments.

The current doubler circuit is composed at the secondary side of the transformer T1 at the first embodiment (ref; FIG. 1), using the diodes D5 and D6, but these diodes D5 and D6 can be replaced by a synchronous rectification circuit using MOSFET. This modification can be applied also to the second through sixth embodiments.

In the first embodiment (ref; FIG. 1), the maximum value selection circuit can be added between the comparison amplifier 79 and the adder 98, even though such a circuit is not shown, to compare the input current deviation Vdduty, generated by the comparison amplifier 79, and the output voltage deviation Voduty, generated by the comparison amplifier 77, then outputs larger one into the adder 98 as the input current deviation Vdduty. If this maximum value selection circuit is added, relationship of (input current deviation Vdduty)>= (output voltage deviation Voduty) is always kept, so the circuit is useful when control is unstable, for example at starting time of a power converter. This modification can be applied also to the second through sixth embodiments.

In the first embodiment (ref; FIG. 1), the logic circuit for the driving signal generation circuit 97 is shown, but this is only an example. Logic circuits with equivalent function can be formed in various ways. Also, the drive circuit 75 or the positive-negative decision circuit 76 can be included into the drive signal generating circuit 97.

In the second embodiment (ref; FIG. 5), addition of the active clamp circuit 201 is explained, but the active clamp circuit 201 is also an effective method for the third through sixth embodiments to clamp voltage arising at secondary winding and improve efficiency.

In the third embodiment (ref; FIG. 7), the interleave operation is explained for two power converters in parallel connection, with the capacitor C3 in common, but this operation is applicable to not only the third embodiment but also the fourth through sixth embodiments, as an effective method.

In the fourth embodiment (ref; FIG. 9), the half-bridge circuit is made at the primary side of the transformer, by adding the capacitor C4 between a connection point of the primary winding N1 of the transformer and the capacitor C2 and a connection point between the diode D3 and the capacitor C1, but this operation is applicable to not only the fourth embodiment but also the first to third, fifth and sixth embodiments, as an effective method.

In the sixth embodiment (ref; FIG. 11), a sample circuit is shown as the power factor correction converter 501 in FIG. 11 in case of a two-stage power converter, however this is not the only one but other circuits with equivalent functions can be also applicable as far as such circuits have a booster function and appropriate PWM control is done.

In the sixth embodiment (ref; FIG. 11), the half-bridge circuit is shown as an example for the insulated type DC-DC converter 502, however a full-bridge circuit can be used as well.

In the first through sixth embodiments, the switching components Q1 through Q3 (and Q4) were explained with MOSFET (Metal-Oxide-Semiconductor Field-Effect Transistor), but those components can be IGBT (Insulated Gate Bipolar Transistor), BJT (Bipolar Junction Transistor) or some other appropriate transistors.

In the embodiments of the invention above, the switching components with low ON resistance need to be used for reducing conduction loss at the switching components Q1 through Q4, and power semiconductor transistors such as SiC (Silicon Carbide) or GaN (Gallium Nitride) can be also used.

In the first through sixth embodiments, the control circuits can be realized with analog control, digital control or mixture of analog and digital control.

In case of the digital control, the control circuits may include micro computer, DSP (Digital Signal Processor), ASIC or others.

Supplement for the Invention and Embodiments

According to the invention, a high power factor (more than 98%) is gained, because the input current waveform becomes a sign waveform for the total voltage area of the AC power supply, by controlling the intermediate voltage at constant setting value with intermediate voltage control using intermediate voltage and load current, in addition to power factor correction control using the input current and the output voltage over input current waveform control, therewith discontinuous mode in small current region and shifting to continuous mode as it becomes large current region.

The single-stage converters in the embodiments have less number of converter stages or diagram components than two stage converters, and the single-stage converters can achieve low loss with continuous mode in large current region of rated load, so they have advantage of making low cost and high efficiency appliances.

In addition, the control method with the output voltage control circuit, the intermediate voltage control circuit and the power factor correction control circuit can be applied not only to single-stage power converters but also to two-stage power converters.

Lastly, the power converters by the first through sixth embodiments can be applied to power converters for various industry appliances, power converters for communication and information equipments, general insulated AC-DC converters and so forth, even though they are not shown in the chart.

We claim:

1. A power converter comprising:
a first inductor;
a rectifier arm including a first diode and a second diode with series connection in forward-polarity;
a first switch arm including a first switch circuit and a second switch circuit in series connection, each having a semiconductor switching component and a diode in reverse parallel;
a second switch arm including a third switch circuit, having a semiconductor switching component and a diode in reverse parallel, and a first capacitor in series connection;
a LC serial circuit including a second inductor and a second capacitor in series connection;
a Transformer including a primary winding and a secondary winding;
a rectification and smoothing circuit connected to the secondary winding of the transformer; and
a control circuit to perform on-off control of the first, the second and the third switch circuits based on a PWM signal,
wherein
the rectifier arm, the first switch arm, the second switch arm and the LC serial circuit are connected in parallel with each other,
the second inductor of the LC serial circuit, the second capacitor and the primary winding of the transformer are connected serially,
an AC power supply is connected to the connection point of the first and second diodes in the rectifier arm and the connection point of the first and second switch circuits in the first switch arm via the first inductor, wherein
the control circuit includes:
an output voltage control circuit to perform on-off control of at least one of the first or second switch circuit, in addition to the third switch circuit, for controlling an output voltage from the rectification and smoothing circuit at a specific setting value, using a detection information of the output voltage,
an intermediate voltage control circuit to control an intermediate voltage at a specific setting value, using a detection information of a terminal voltage at the first capacitor and an output current from the rectification and smoothing circuit, and
a power factor correction control circuit to perform on-off control of at least the other of the first or second switch circuit, using a detection information of an input current of the AC power supply and the output voltage from the rectification and smoothing circuit, as well as an output control signal from the intermediate voltage control circuit.

2. The power converter according to claim 1,
wherein the rectification and smoothing circuit includes a current doubler circuit comprising:
two rectification circuits serially connected to each other;
a third and a fourth inductors respectively connected serially with each of the rectification circuits; and
a third capacitor connected to a connection point of the two rectification circuits serially connected and a connection point of the third and the fourth inductors serially connected, and wherein
a terminal voltage of the third capacitor of the rectification and smoothing circuit is outputted as an output voltage of the power converter.

3. The power converter according to claim 1,
wherein the transformer have two secondary windings, and the rectification and smoothing circuit comprises two rectification circuits to rectify voltage at each of the two secondary windings, and the third inductor and the third capacitor to smooth output voltage at the two rectification circuits, making the terminal voltage of the third capacitor as the output voltage from the power converter.

4. The power converter according to claim 1, further comprising an active clamp circuit comprising:
a series connection circuit includes a seventh switch circuit, having a semiconductor switching component and a diode connected in reverse parallel, and a first clamp condenser; and
a series connection circuit includes an eighth switch circuit, having a semiconductor switching component and a diode connected in reverse parallel, and a second clamp condenser,
wherein the seventh and the eighth switching circuits of the active clamp circuits are connected to both ends of the secondary winding of the transformer, and a terminal voltage of the secondary winding is clamped, and energy accumulated at the clamp condenser is recovered by the third capacitor, while the seventh and eighth switching circuits are turned on after clamp operation.

5. The power converter according to claim 2,
wherein each of the two rectification circuits comprises two diodes or two switching circuits.

6. The power converter according to claim 2,
wherein an additional power converter with the same diagram as the power converter under claim 2 is arranged in parallel,
each of output terminals are connected via the third capacitor, and
the two power converters work in interleave operation.

7. The power converter according to claim 1,
wherein a forth capacitor is added between the connection points of the first capacitor and the second capacitor.

8. The power converter according to claim 1,
wherein the control circuit comprises:
the output voltage control circuit to generate a first PWM signal based on an output voltage deviation between an output voltage command value and the output voltage detection value at the output from the power converter;
the intermediate voltage control circuit to compensate and generate a new intermediate voltage command value based on the intermediate voltage command value and the output current detection value at the output from the power converter, then to generate an intermediate voltage deviation based on the new intermediate voltage command value and the intermediate voltage detection value detected at the terminal voltage of the first capacitor; and
the power factor correction control circuit to generate an input current deviation based on an input current command value, generated by multiplying coefficient with the output voltage deviation, and the absolute value of an input current detection value, detected from the input current of the AC power supply, and to generate a second PWM signal based on the new input current deviation, generated by adding the intermediate voltage deviation to the input current deviation, then to perform on-off control of at least remaining one of the first and second switch circuits, wherein
the third switch circuit is turned on while a switch circuit to perform on-off control at the output voltage control circuit is turned off among the first and second switch circuits.

9. The power converter according to claim 1,
wherein the control circuit comprises:
an output voltage detection circuit to detect the output voltage from the power converter;
a first comparing unit to generate the output voltage deviation based on the output voltage detected value, by the output voltage detection circuit, and the output voltage command value;
a first PWM signal generating circuit to generate a PWM signal, by comparing the output voltage deviation and a PWM carrier;
an input voltage detection circuit to detect the input voltage of the AC power supply;
an input current detection circuit to detect the input current;
an absolute value circuit to get the absolute value of the detected input current;
an intermediate voltage detection circuit to detect the intermediate voltage;
an output current detection circuit to detect the output current;
a coefficient circuit to generate the input current command value by multiplying efficient with the output voltage deviation;
a second comparing unit to generate the input current deviation based on the input current command value and the input current detected value generated by the absolute value circuit;
a command value compensation circuit to generate a compensation value for the intermediate voltage command value based on the output current detected value detected by the output current detection circuit;
a first adding unit to generate a new intermediate voltage command value by subtracting the compensation value, generated by the command value compensation circuit, from the intermediate voltage command value;
a third comparing unit to generate an intermediate voltage compensation deviation based on the intermediate voltage detected value, detected by the intermediate voltage detection circuit, and the new intermediate voltage command value;
a second adding unit to generate a new input current deviation by adding the intermediate voltage compensation deviation and the input current deviation; and
a second PWM signal generating circuit to generate a PWM signal by comparing the new input current deviation and the PWM carrier; and a driving signal generating circuit to generate, while the half-cycle of the voltage polarity at the AC power supply is positive,
- a driving signal to turn the second switch circuit on and off based on the PWM signal generated by the first PWM signal generating circuit,
- a driving signal to turn the first switching circuit on and off based on the PWM signal generated by the second PWM signal generating circuit, and
- a driving signal to turn the third switching circuit on during the second switching circuit is off, and to generate, while the half-cycle of the voltage polarity at the AC power supply is negative,
- a driving signal to turn the first switch circuit on and off based on PWM signal generated by the first PWM signal generating circuit,
- a driving signal to turn the second switching circuit on and off based on PWM signal generated by the second PWM signal generating circuit, and
- a driving signal to turn the third switching circuit on during the first witching circuit is off.

10. The power converter according to claim 9,
wherein a maximum value selection circuit is added between the third comparing unit and the second adding unit, to compare the input current deviation and the output voltage deviation, then to output the larger deviation as input current deviation.

11. The power converter according to claim 1,
wherein the output voltage control circuit, the intermediate voltage control circuit and the power factor correction control circuit in the control circuit are digital control circuits.

12. The power converter comprising:
a first inductor;
a rectifier arm including a first diode and a second diode in series connection in forward-polarity;
a first switch arm including a first switch circuit and a second switch circuit in series connection;
a second switch arm including a third switch circuit and a fourth switch circuit in series connection;
a first capacitor;
a LC serial circuit including a second inductor and a second capacitor in series connection;
a Transformer consisting of a primary winding and a secondary winding;
a rectification and smoothing circuit connected to the secondary winding of the transformer; and
a control circuit to perform on-off control of the first, the second, the third and the fourth switch circuits based on a PWM signal,
wherein
the rectifier arm, the first switch arm, the second switch arm, the first capacitor and the LC serial circuit are connected in parallel with each other,
the second inductor of the LC serial circuit, the second capacitor and the primary winding of the transformer are connected serially,
an AC power supply is connected to the connection point of the first and second diodes in the rectifier arm and the connection point of the first and second switch circuits in the first switch arm via the first inductor, and
the control circuit includes
an output voltage control circuit to perform on-off control of the third and the fourth switch circuits complementarily, for controlling the output voltage at a specific setting value, using an information of the output voltage,
an intermediate voltage control circuit to control an intermediate voltage at a specific setting value, using a detection information of an intermediate voltage, or a terminal voltage at the first capacitor, and an output current, and
a power factor correction control circuit to perform on-off control of at least one of the first or second circuit, using a detection information of an input current and the output voltage, as well as result from the intermediate voltage control.

13. A control method for a power converter comprising:
a first inductor;
a rectifier arm including a first diode and a second diode in series connection in forward-polarity;
a first switch arm including a first switch circuit and a second switch circuit in series connection, both of each having a semiconductor switching component and a diode in reverse parallel;
a second switch arm including a third switch circuit, having a semiconductor switching component and a diode in reverse parallel, and a first capacitor in series connection;
a LC serial circuit including a second inductor and a second capacitor in series connection;
a Transformer consisting of a primary winding and a secondary winding;
a rectification and smoothing circuit connected to the secondary winding of the transformer; and
a control circuit to perform on-off control of the first, the second and the third switch circuits based on a PWM signal,
wherein
the rectifier arm, the first switch arm, the second switch arm and the LC serial circuit are connected in parallel with each other,
the second inductor of the LC serial circuit, the second capacitor and the primary winding of the transformer are connected serially, and
an AC power supply is connected to the connection point of the first and second diodes in the rectifier arm and the connection point of the first and second switch circuits in the first switch arm via the first inductor,
to control
an output voltage for performing on-off control of at least one of the first or second switch circuit, in addition to the third switch circuit, for controlling an output voltage from the output circuit at a specific setting value, using an output voltage information,
an intermediate voltage for controlling an intermediate voltage at a specific setting value, using a detection information of a terminal voltage at the first capacitor and an output current, and
a power factor correction for performing on-off control of at least the other of the first or second switch circuit, using a detection information of an input current and the output voltage, as well as the result from the intermediate voltage control.

14. A control method for a power converter comprising:
a first inductor;
a rectifier arm including a first diode and a second diode in series connection in forward-polarity;
a first switch arm including a first switch circuit and a second switch circuit in series connection, both of each having a semiconductor switching component and a diode in reverse parallel;
a second switch arm including a third switch circuit, having a semiconductor switching component and a diode in reverse parallel, and a fourth switch circuit, having a semiconductor switching component and a diode in reverse parallel, in series connection;

a first capacitor;

a LC serial circuit including a second inductor and a second capacitor in series connection;

a Transformer consisting of a primary winding and a secondary winding;

a rectification and smoothing circuit connected to the secondary winding of the transformer; and a control circuit to perform on-off control of the first, the second, the third and the fourth switch circuits based on a PWM signal, wherein the rectifier arm, the first switch arm, the second switch arm, the first capacitor and the LC serial circuit are connected in parallel with each other, the second inductor of the LC serial circuit, the second capacitor and the primary winding of the transformer are connected serially, and an AC power supply is connected to the connection point of the first and second diodes in the rectifier arm and the connection point of the first and second switch circuits in the first switch arm via the first inductor, to control an output voltage for performing on-off control of the third and fourth switch circuits complementarily, for controlling output voltage from the output circuit at a specific setting value, using an output voltage information, an intermediate voltage for controlling an intermediate voltage at a specific setting value, using a detection information of an intermediate voltage, or a terminal voltage at the first capacitor, and an output current, and a power factor correction for performing on-off control of at least one of the first or second switch circuit, using the detection information of an input current and the output voltage, as well as the result from the intermediate voltage control.

15. A Hard Disk Drive having a power converter to supply power, wherein the power converter is described at claim 1.

16. The Hard Disk Drive described at claim 15, wherein the Hard Disk Drive includes a magnetic storage disk, a magnetic head, a magnetic-disk rotating drive, a magnetic-head drive, a magnetic-head position controller and an input/output signal controller.

* * * * *